US009305064B1

(12) United States Patent  
LeBeau et al.

(10) Patent No.: US 9,305,064 B1
(45) Date of Patent: Apr. 5, 2016

(54) KEYWORD-BASED CONVERSATIONAL SEARCHING USING VOICE COMMANDS

(71) Applicant: Google Inc., Mountain View, CA (US)

(72) Inventors: Michael J. LeBeau, New York, NY (US); Srinivasan Venkatachary, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 301 days.

(21) Appl. No.: 13/902,317

(22) Filed: May 24, 2013

(51) Int. Cl.
 *G06F 7/00* (2006.01)
 *G06F 17/30* (2006.01)

(52) U.S. Cl.
 CPC ................................ *G06F 17/30533* (2013.01)

(58) Field of Classification Search
 None
 See application file for complete search history.

(56) References Cited

U.S. PATENT DOCUMENTS

| 7,191,129 | B2 | 3/2007 | Brown et al. |
| 8,037,070 | B2* | 10/2011 | Maghoul ...................... 707/736 |
| 8,135,728 | B2 | 3/2012 | Yih et al. |
| 2006/0026206 | A1* | 2/2006 | Loghmani ............... G06Q 30/06 |
| 2008/0154870 | A1* | 6/2008 | Evermann ......... G06F 17/30867 |
| 2011/0214082 | A1* | 9/2011 | Osterhout ............ G02B 27/017 715/773 |
| 2012/0019662 | A1* | 1/2012 | Maltz ...................... G06F 3/013 348/158 |
| 2013/0006629 | A1* | 1/2013 | Honda et al. .................. 704/236 |
| 2013/0031074 | A1 | 1/2013 | Vartanian et al. |
| 2013/0063550 | A1 | 3/2013 | Ritchey et al. |

* cited by examiner

*Primary Examiner* — Tuan A Pham
(74) *Attorney, Agent, or Firm* — McDonnell Boehnen Hulbert & Berghoff LLP

(57) ABSTRACT

Methods, apparatus, and computer-readable media are described herein related to keyword-based conversational searching using voice commands. A computing device can receive an audio command for performing a search query. The computing device may receive a plurality of keywords associated with a subject matter of the search query, and computing device may configure the plurality of keywords as a plurality of audio instructions receivable by the computing device to cause the computing device to perform a subsequent search query. The computing device can then provide the plurality of keywords for display, along with search results associated with the search query.

9 Claims, 12 Drawing Sheets

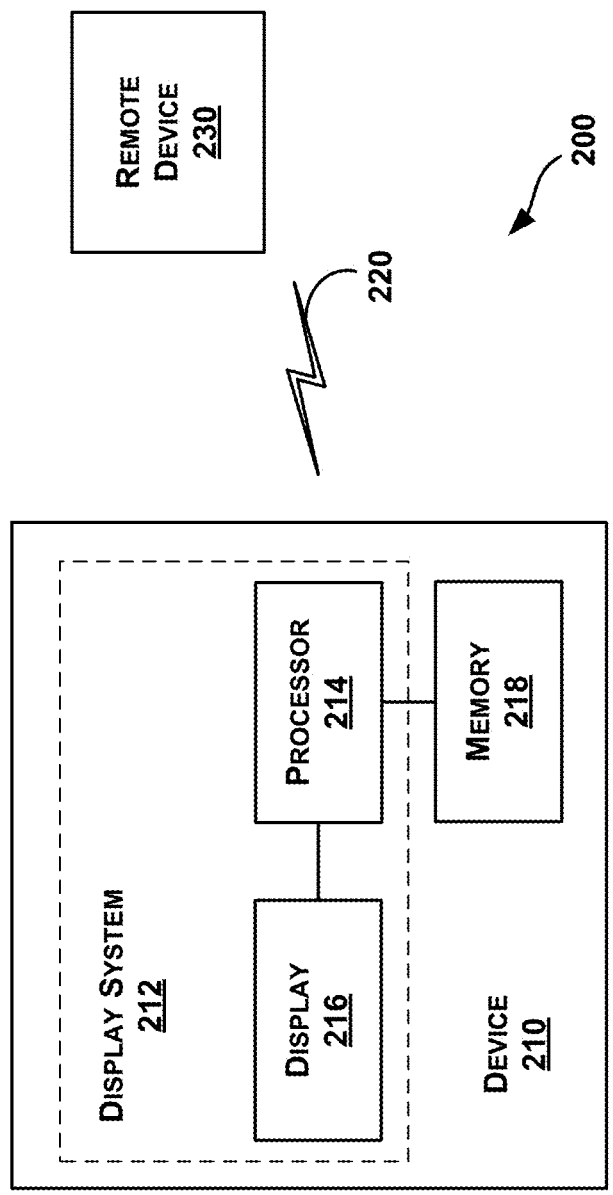

KEYWORD-BASED CONVERSATIONAL SEARCHING USING VOICE COMMANDS

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays can be components of wearable displays, also sometimes called "head-mounted displays" or "head-mountable devices" (HMDs). A head-mounted display places a graphic display or displays close to one or both eyes of a wearer. To generate the images on a display, a computer processing system may be used. Such displays may occupy part or all of a wearer's field of view. Further, head-mounted displays may be as small as a pair of glasses or as large as a helmet.

SUMMARY

In one aspect, the present application describes a method. The method may comprise receiving, at a computing device, an audio command for performing a search query. The method may also comprise receiving, at the computing device, a plurality of keywords associated with a subject matter of the search query. The method may further comprise the computing device configuring the plurality of keywords as a plurality of audio instructions receivable by the computing device to cause the computing device to perform a subsequent search query. The method may still further comprise providing the plurality of keywords for display, along with search results associated with the search query.

In another aspect, the present application describes a system. The system may comprise a head-mountable device (HMD) and at least one processor coupled to the HMD. The system may also comprise data storage comprising instructions executable by the at least one processor to cause the system to perform functions. The functions may comprise receiving, at the HMD, an audio command for performing a search query. The functions may also comprise receiving, at the HMD, a plurality of keywords associated with a subject matter of the search query. The functions may further comprise the HMD configuring the plurality of keywords as a plurality of audio instructions receivable by the HMD to cause the HMD to perform a subsequent search query. The functions may still further comprise providing the plurality of keywords for display, along with search results associated with the search query.

In yet another aspect, the present application describes a non-transitory computer readable medium having stored thereon executable instructions that, upon execution by a computing device, cause the computing device to perform functions. The functions may comprise receiving an audio command for performing a search query. The functions may also comprise receiving, at the computing device, a plurality of keywords associated with a subject matter of the search query. The functions may further comprise the computing device configuring the plurality of keywords as a plurality of audio instructions receivable by the computing device to cause the computing device to perform a subsequent search query. The functions may still further comprise providing the plurality of keywords for display, along with search results associated with the search query.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

FIG. 2 illustrates a schematic drawing of a computing device according to an example embodiment.

DETAILED DESCRIPTION

Figure 1A:
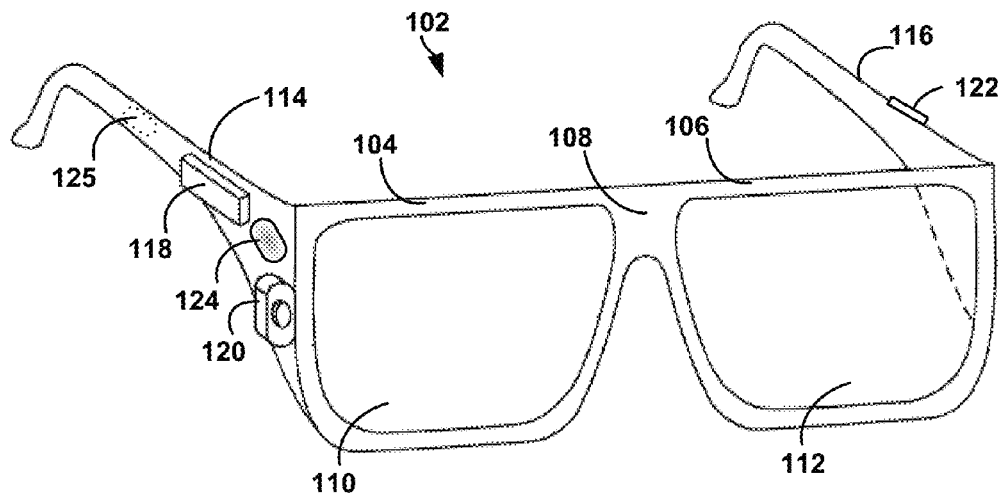
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

The following detailed description may disclose, inter alia, systems and methods for keyword-based conversational searching using voice commands. "Conversational searching" may refer to a multiple-step dialogue between a user and a search engine. For instance, a user may perform an initial search, and may desire to follow the initial search with a subsequent search related to the initial search, and may then follow the subsequent search with yet another search, and so on. After a given search is performed, a computing device may be configured to provide multiple keywords for display, each associated with a subsequent search. The computing device may also be configured to listen for the keywords and perform the subsequent search upon hearing the user speak one or more of the keywords. As such, the computing device may be configured to provide a voice interface and listen for speech commands (also referred to as "audio commands"). The computing device may continuously listen for speech, so that the user can readily use the speech commands to interact with the computing device (e.g., perform searches or perform other functions of the computing device).

An example method generally involves a computing device receiving an audio command for performing a search query. The computing device may then determine keywords based on a subject matter of the search query, and configure the keywords as audio instructions receivable by the computing device to cause the computing device to perform a subsequent search query. The computing device may then provide the keywords for display, along with search results associated with the search query. A user of the computing device can speak one of the keywords on display (e.g., provide an audio instruction) and the computing device may responsively perform the subsequent search query.

In an example scenario, a user of the computing device may provide an audio command such as "Search for Painter X." The computing device may then determine keywords associated with "Painter X," the subject matter of the search query. In order to determine the keywords, for instance, the computing device may refer to a history of search queries related to Painter X. For instance, common search queries associated with Painter X may include queries regarding his scientific experiments (e.g., "What were some of Painter X's experiments?"), a particular famous painting of Painter X, and Painter X's paintings in general, among other queries. Thus, the determined keywords may include "Science," "Painting #1," and "Paintings," among others keywords. Further, upon the computing device receiving "Paintings" as an audio instruction spoken by the user, the computing device may perform a search for all of Painter X's paintings, and may provide one or more keywords for display including specific paintings such as "Painting #1" and "Painting #2," so as to enable the user to perform a search query for those paintings and display more specific information about them. Other example scenarios are also possible.

Once the keywords are determined, the user may be enabled to quickly traverse from one search to another by speaking subsequent keywords instead of providing lengthier audio commands to perform searches. For example, after searching for Painter X, the user may not need to say "Where was Painter X born?" in order to find out where Painter X was born. Rather, the user may only need to say "birth," if such a keyword is provided. Displaying the keywords at the computing device may also enable quick traversing through searches, since the user is continuously provided with new sets of keywords after each search. As an example traverse, the user may initially search for Painter X and eventually be provided with search results for a curator of a museum where Painting #1 is located via a sequence of keywords: "Painter X. Paintings. Painting #1. Museum of Art. Curator of Museum of Art."

In some embodiments, the computing device may be a head-mountable device (HMD). The HMD may include a display, and a microphone or other sensor configured to receive audio commands/instructions. In other embodiments, the computing device may be a desktop computer, tablet computer, or smartphone. Further the computing device may be a wearable device, such as a watch or glasses, a robot device, such as a device with electromechanical capabilities, or an appliance, such as a television. Other computing devices are also possible.

It should be understood that the above examples of the method are provided for illustrative purposes, and should not be construed as limiting.

II. EXAMPLE WEARABLE COMPUTING DEVICES

Systems and devices in which example embodiments may be implemented will now be described in greater detail. In general, an example system may be implemented in or may take the form of a WCD. In an example embodiment, a WCD takes the form of or includes a head-mountable device (HMD).

An example system may also be implemented in or take the form of other devices, such as a mobile phone, tablet computer, laptop computer, and computing appliance, each configured with sensors, cameras, and the like arranged to capture/scan a user's eye, face, or record other biometric data. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touchpad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touchpad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 124 is shown on the extending side-arm 114 of the HMD 102. However, the finger-operable touchpad 124 may be positioned on other parts of the HMD 102. Also, more than one finger-operable touchpad may be present on the HMD 102. The finger-operable touchpad 124 may be used by a user to input commands, and such inputs may take the form of a finger swipe along the touchpad, a finger tap on the touchpad, or the like. The finger-operable touchpad 124 may sense at least one of a pressure, position and/or a movement of one or more fingers via capacitive sensing, resistance sensing, or a surface acoustic wave process, among other possibilities. The finger-operable touchpad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 124 may be formed of one or more translucent or transparent insulating layers and one or more translucent or transparent conducting layers. Edges of the finger-operable touchpad 124 may be formed to have a raised, indented, or roughened surface, so as to provide tactile feedback to a user when the user's finger reaches the edge, or other area, of the finger-operable touchpad 124. If more than one finger-operable touchpad is present, each finger-operable touchpad may be operated independently, and may provide a different function.

In a further aspect, HMD 102 may be configured to receive user input in various ways, in addition or in the alternative to user input received via finger-operable touchpad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
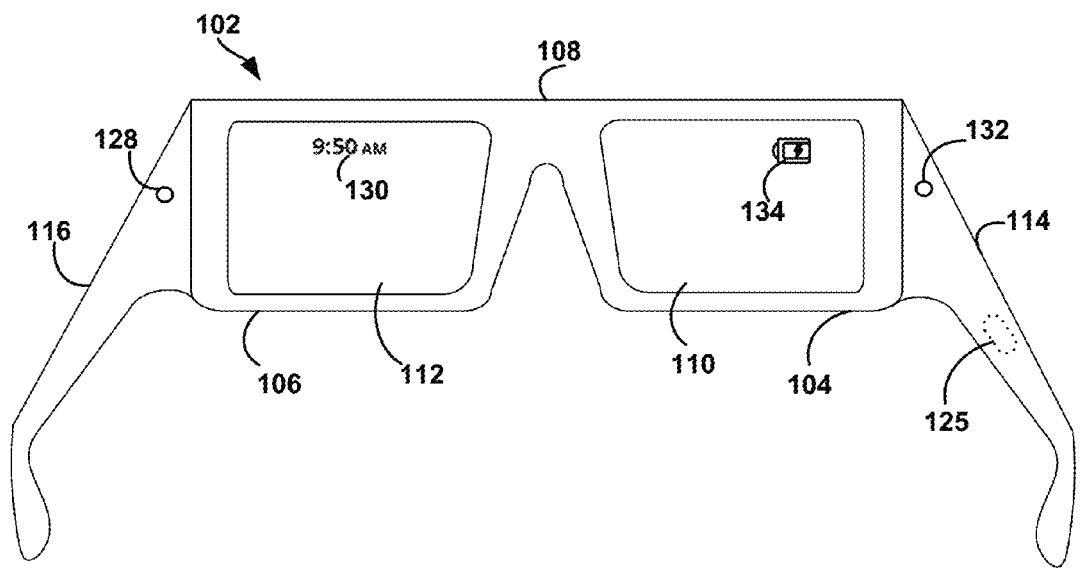
FIG. 1B illustrates an alternate view of the wearable computing system illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
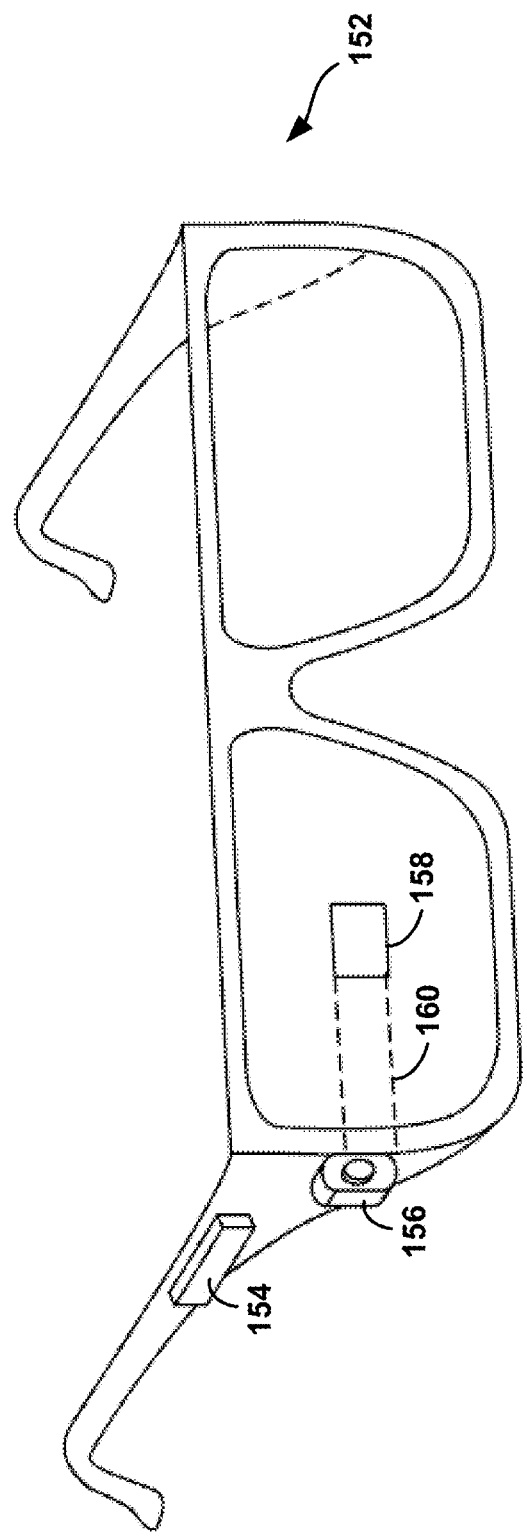
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
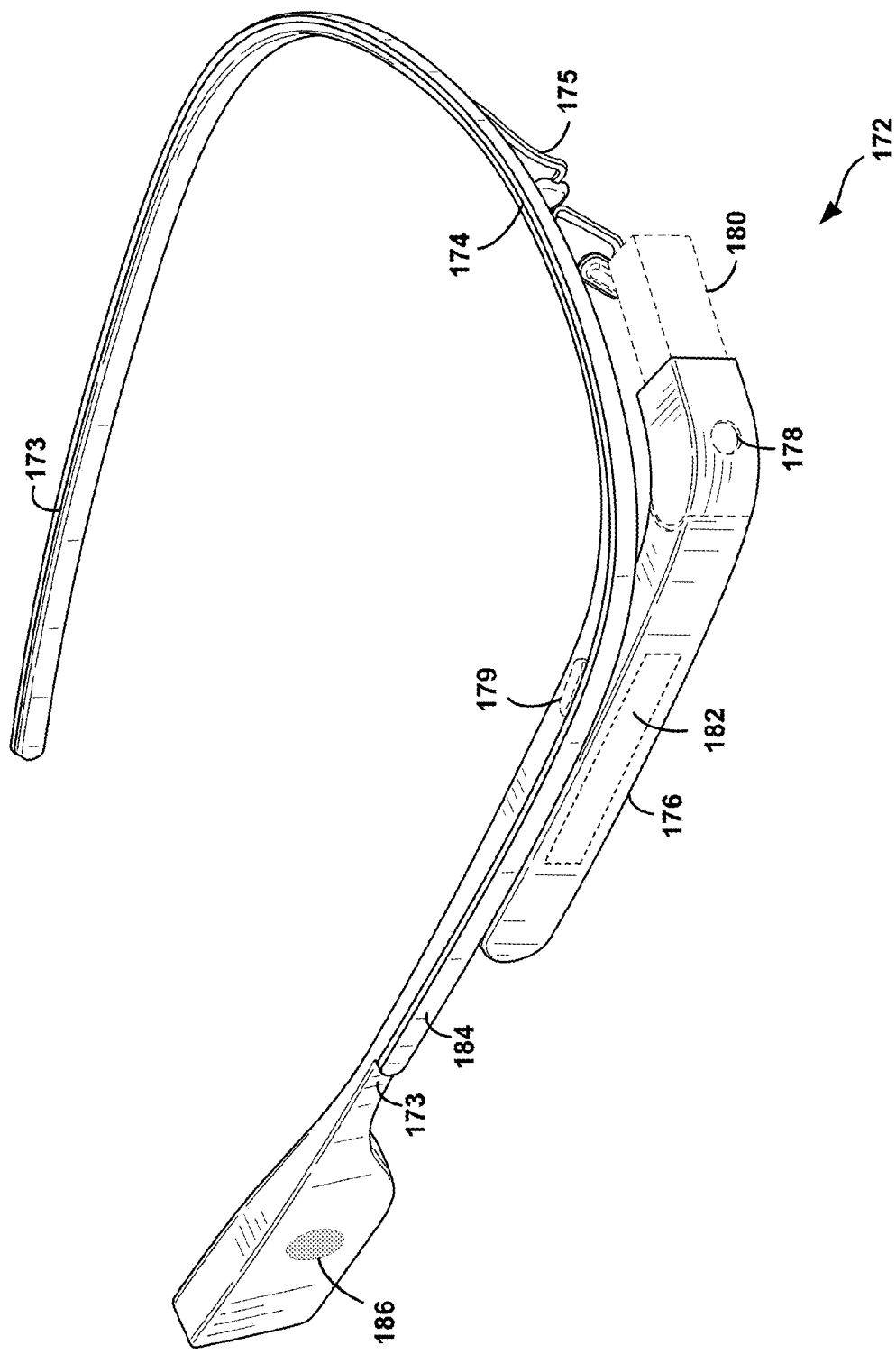
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In some embodiments, the HMD 172 may include one or more infrared proximity sensors or infrared trip sensors. Further, the one or more proximity sensors may be coupled to the HMD 172 at various locations, such as on the nosepiece 175 of the HMD 172, so as to accurately detect when the HMD 172 is being properly worn by a wearer. For instance, an infrared trip sensor (or other type of sensor) may be operated between nose pads of the HMD 172 and configured to detect disruptions in an infrared beam produced between the nose pads. Still further, the one or more proximity sensors may be coupled to the side-arms 173, center frame support 174, or other location(s) and configured to detect whether the HMD 172 is being worn properly. The one or more proximity sensors may also be configured to detect other positions that the HMD 172 is being worn in, such as resting on top of a head of a wearer or resting around the wearer's neck.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
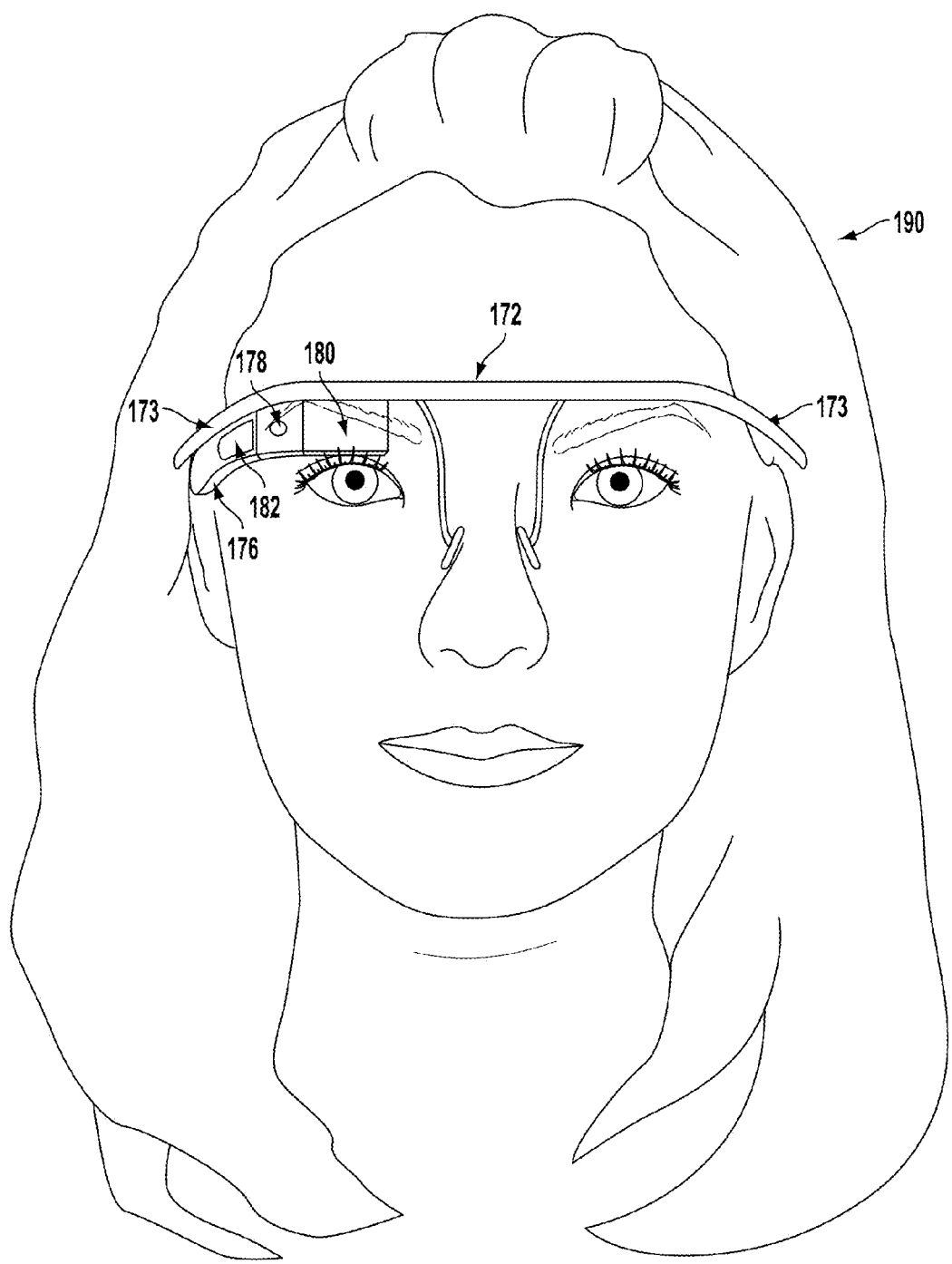
FIGS. 1E-1G are simplified illustrations of the wearable computing system shown in FIG. 1D, being worn by a wearer.
Figure 1F:
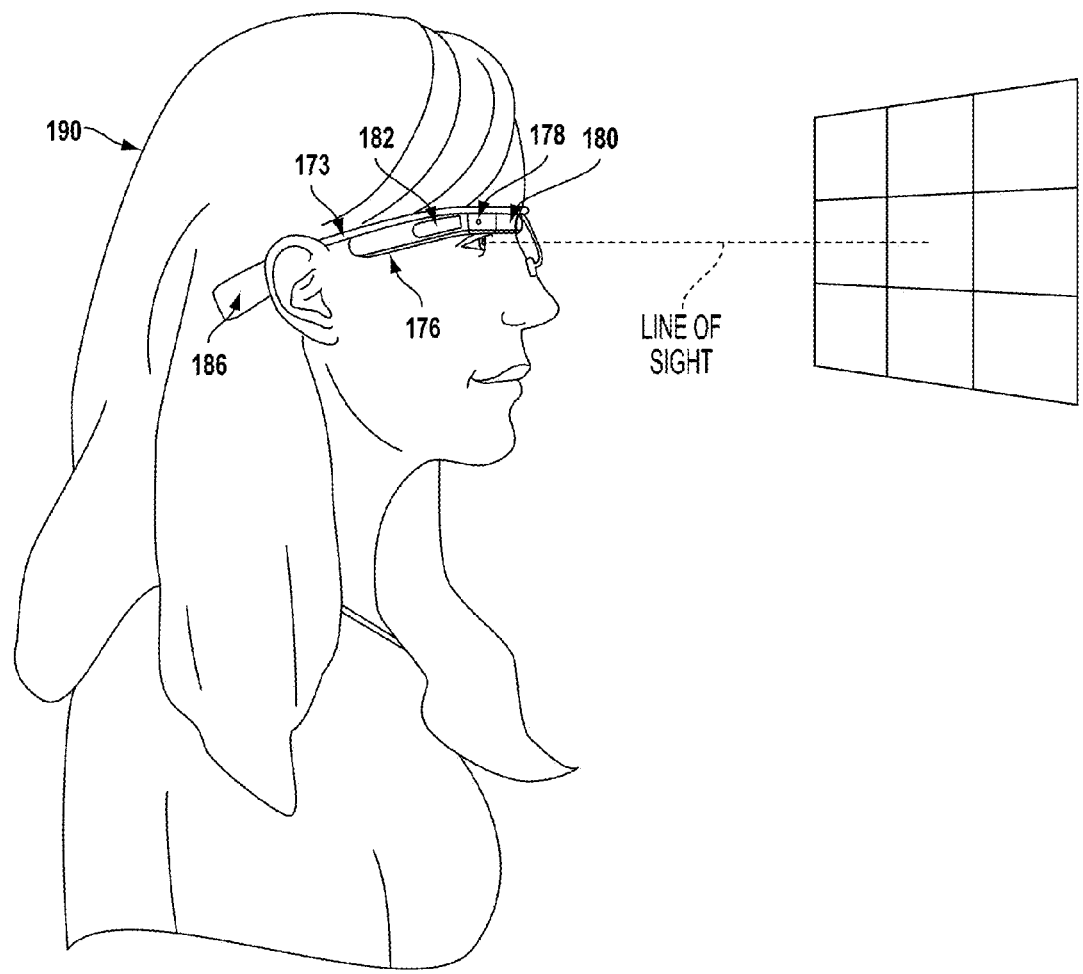
Figure 1G:
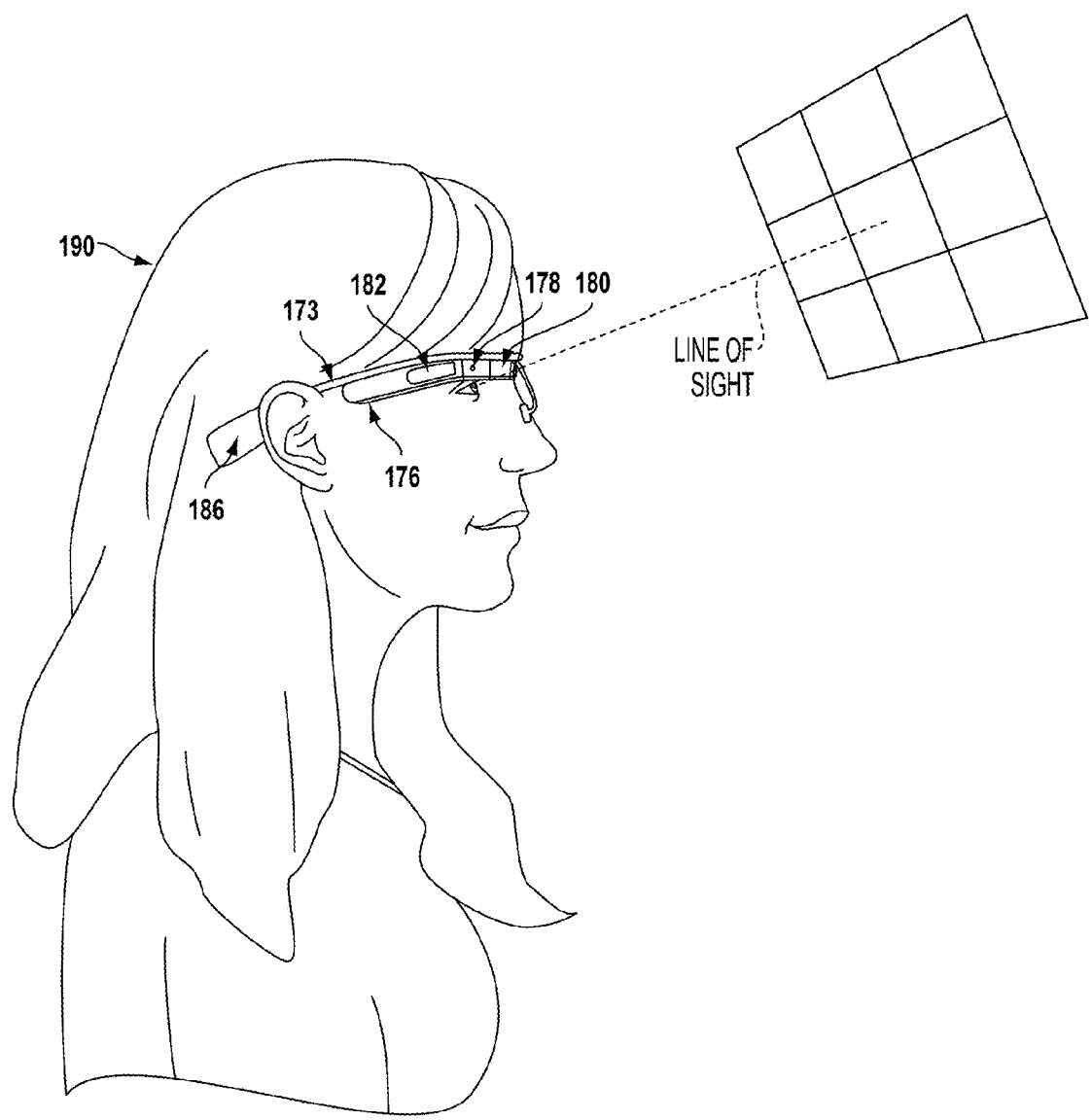

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

FIG. 2 illustrates a schematic drawing of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.)

III. EXAMPLE METHODS AND SCENARIOS

Figure 3:
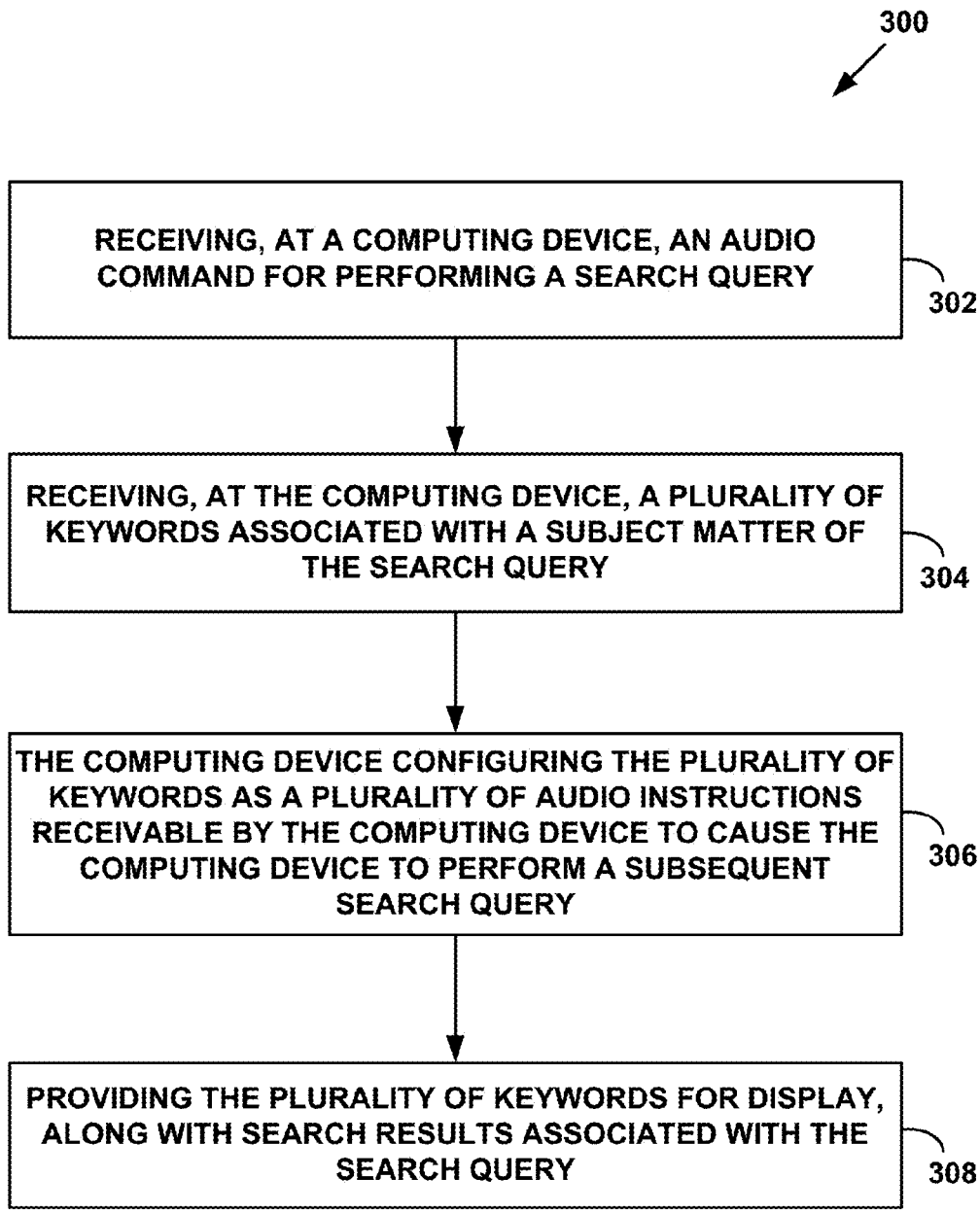
FIG. 3 is a flow chart of an example method according to an example embodiment.

FIG. 3 shows an example method 300, according to an example embodiment. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method 300 will be described as implemented by an example head-mountable device (HMD), such as the HMDs illustrated in FIGS. 1A-1G. It should be understood, however, that other computing entities (both cloud-based and non-cloud-based) and combinations of such entities can implement one or more steps of the method 300 and function as voice-activated search devices. In addition to HMDs, such entities may include desktop computers, laptop computers, smartphones, wearable computing devices (e.g., smart watches), televisions, and server entities, among others. Further, the method 300 will be described hereafter in conjunction with FIGS. 4-6B, which illustrate implementations of the method 300.

Initially, at block 302, the method 300 includes receiving, at a computing device (e.g., the HMD), an audio command for performing a search query. The audio command may take the form of a spoken word or phrase, and in some embodiments, the HMD may be configured to listen for a particular word or phrase to initiate a search query. For example, a user may say the phrase "Ok, HMD. Search for . . . " (or simply the word "Search") followed by a subject matter that the user wishes to search for. Upon hearing the word and/or phrase, the HMD may perform a search query for the subject matter. In such embodiments, the HMD may also be configured to ignore certain spoken words or phrases, and only initiate a search query when a particular word or phrase is spoken. For example, the question "Where is Monument X located?" may not be recognized by the HMD as an audio command and the HMD may not perform a search upon hearing the question, but the phrase "Search for Monument X" may be recognized instead, since the HMD may be configured to only perform search queries for subject matters spoken following an utterance of the word "Search." As another example, the user may have the option to precede a question with the word "Search" in order to perform the search query (e.g., the user may say "Search. Where is Monument X?"). Other examples are also possible.

Figure 4:
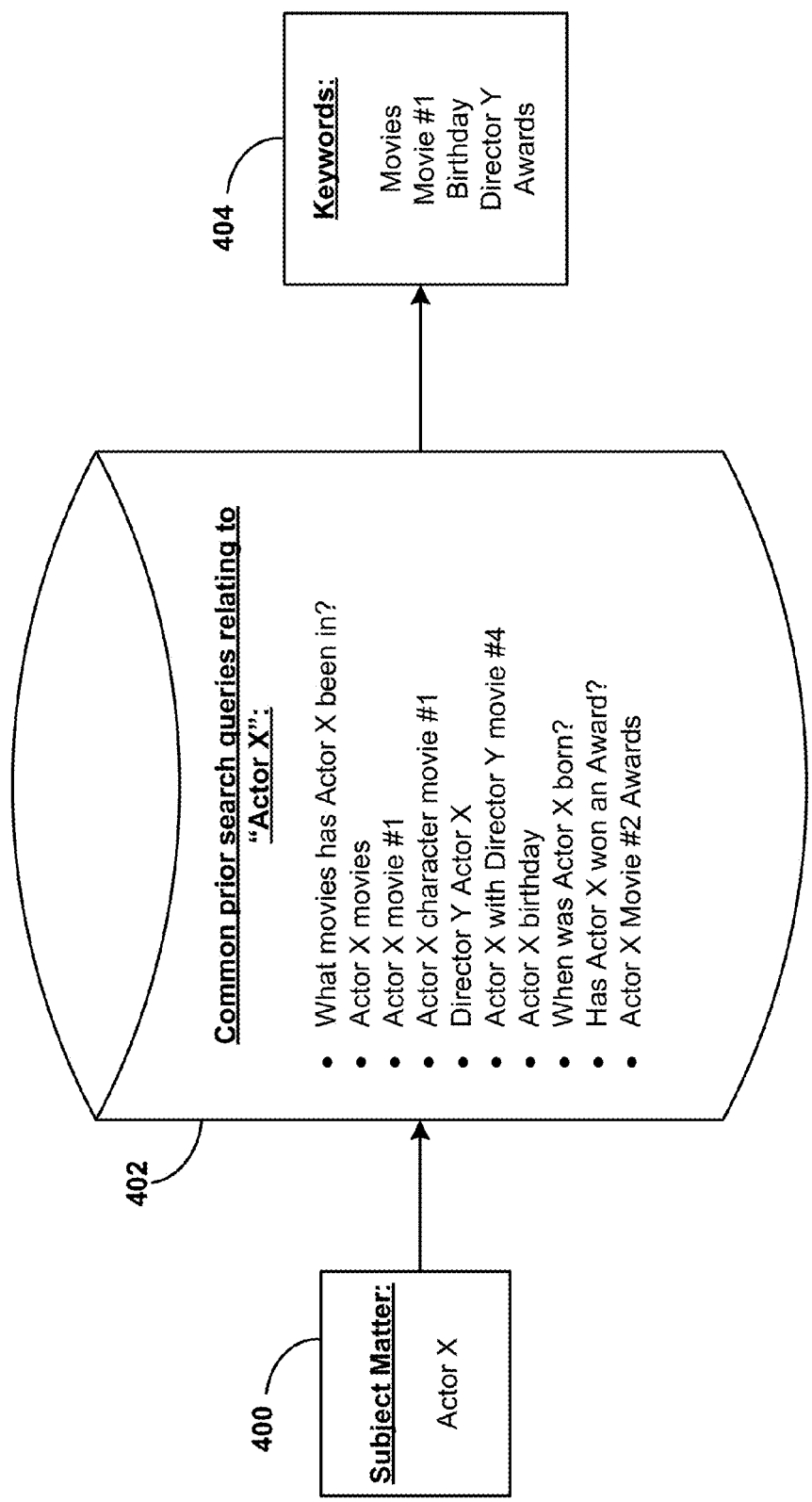
FIG. 4 illustrates another feature of the example method, according to an example embodiment.

At block 304, the method 300 includes receiving a plurality of keywords associated with a subject matter of the search query. Prior to receiving the keywords, the keywords may be determined in various ways, by the HMD and/or another computing device, such as a network server. In an example scenario, as illustrated in FIG. 4, a user of an HMD may provide an audio command, "Search for Actor X," so as to cause the HMD to perform a search query for an actor, Actor X, who is the subject matter 400 of the search query. The HMD and/or server may then refer to one or more prior search queries 402 relating to the subject matter 400, Actor X, in order to determine at least a portion of the keywords.

For example, the keywords may be based on a frequency of submission of prior search queries 402 relating to the subject matter 400 of the search query, where the prior search queries 402 may include search terms associated with the subject matter 400. The frequency of submission may indicate a common occurrence of a particular search term or search query received (e.g., typed or spoken by a user) by search engines at one or more computing devices, which may include the HMD itself. As such, one or more of the keywords can be determined based on at least one search term included in the prior search queries if the frequency of submission of the prior search queries (and/or a frequency of search terms) exceeds a given threshold. The given threshold may be predetermined or may adjust itself automatically based on changing frequencies of submissions of prior search queries.

Further, the frequency of submission (or other information indicating prior search queries) may be sent to the HMD by a network server or cloud computing device. Additionally or alternatively, the HMD may have locally stored information indicating the prior search queries 402.

As shown in FIG. 4, such frequently-submitted prior search queries 402 may include "What movies has Actor X been in?", "Actor X movies," "Actor X birthday," and so on. From these prior search queries 402, the HMD (or other computing device) may extract keywords 404 representative of ideal follow-up search queries for the subject matter 400 (e.g., subsequent queries that the user may desire to perform in order to find other information relating to the subject matter).

For instance, a threshold high number of prior search queries 402 relating to the subject matter 400 may include search terms such as "movies" (e.g., "Actor X movies," and "What movies has Actor X been in?"), "birthday" (e.g., "Actor X's birthday," and/or "Where was Actor X born?"), "Movie #1" (e.g., "Actor X movie #1"), and others. Therefore, these search terms and others may be included by the HMD as keywords 404. It should be understood that the list of keywords 404 may include more or less keywords than those shown in FIG. 4, based on the prior search queries 402, the subject matter 400, a configuration of the HMD (e.g., setting the HMD to display only three keywords per search query), and/or other factors. Various methods and algorithms not described herein can also be used to determine the keywords.

Figure 5:
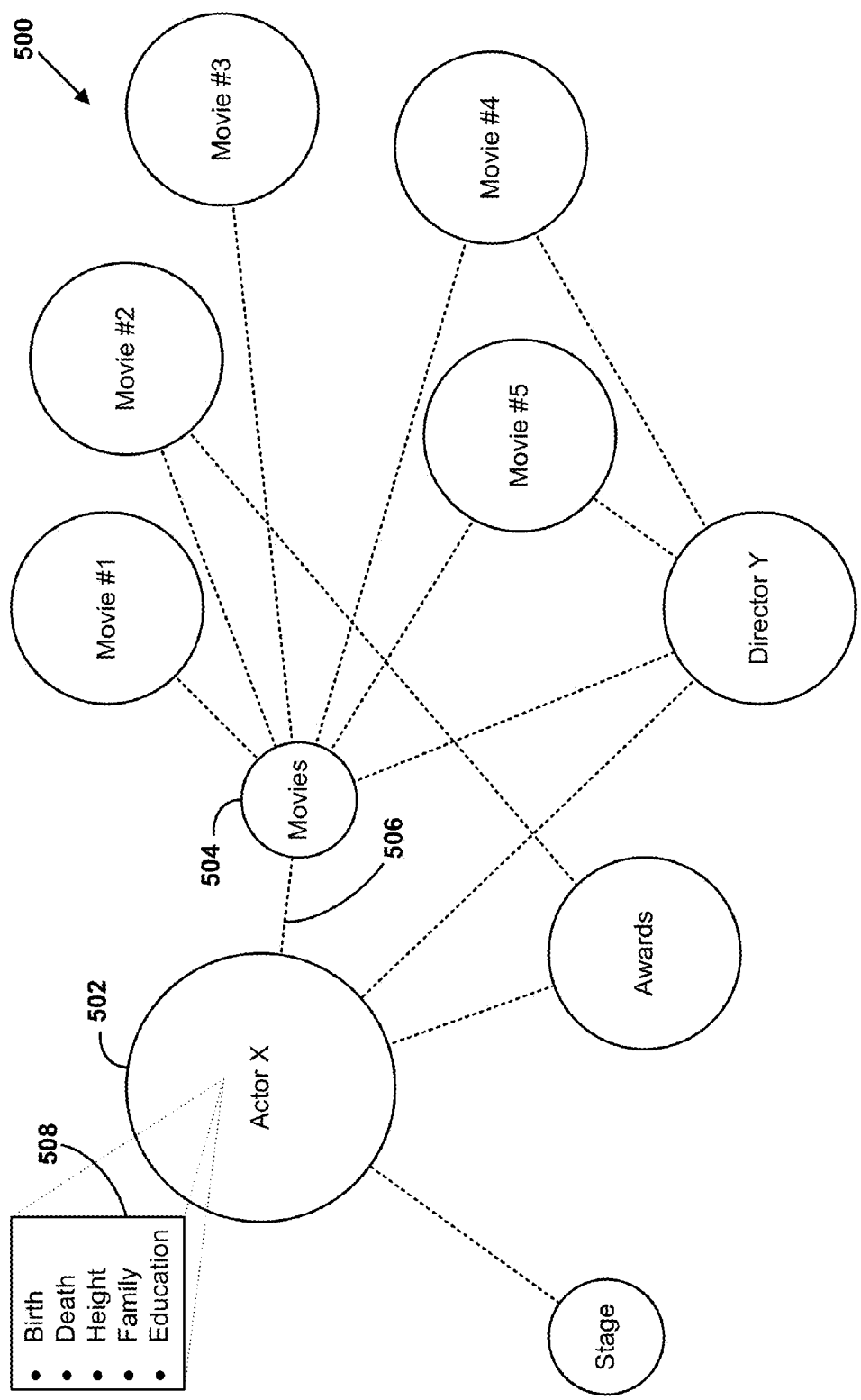
FIG. 5 illustrates another feature of the example method, according to an example embodiment.

FIG. 5 illustrates another example scenario, in which the plurality of keywords may be determined based on a network of predetermined relationships 500 between the subject matter and other subject matters. In general, the network 500 may be included as part of a knowledge database that provides a means for information to be managed and utilized by search engines for performing search queries. The information (e.g., the subject matters) may be structured according to known relationships. Such knowledge databases may be machine-readable, having automated deductive reasoning processes applied when utilizing the database for a search query. Additionally or alternatively, such knowledge databases may be human-readable, enabling users to retrieve and use the information stored in the database (e.g., via a search engine). Further, the information may include semantic information so as to enable users to perform search queries with a semantic search engine. The network 500 illustrated in FIG. 5 is an example of a semantic network, but it should be understood that other networks and knowledge databases of information may be used to determine the plurality of keywords.

The network 500 may include the subject matter 502 of the search query, Actor X, and at least one other subject matter 504, such as Movies, that is associated with Actor X. In the network 500, semantic descriptions of Actor X and Movies may include a semantically-described relationship 506 (e.g., a "semantic relationship") between the two subject matters 502-504 representative of the movies that Actor X has acted in. Further, as shown in FIG. 5, Movies may have semantic relationships with other subject matters, namely movies that Actor X has acted in, such as "Movie #1," "Movie #2," and "Movie #3." Still further, both Actor X 502 and Movies 504 may have semantic relationships with yet another subject matter, Director Y, since Director Y is a director of some movies that Actor X 502 has acted in, such as Movie #4 (and so there may be a semantic relationship between Director Y and Movie #4 as well).

The HMD and/or server may determine the keywords after identifying the semantic relationships between Actor X and the other subject matters. For example, the keywords (e.g., the keywords 404 shown in FIG. 4) may include "Movies," "Awards," and "Director Y," since the network 500 includes semantic relationships between Actor X and those subject matters. In some embodiments, the keywords may be determined by prior search queries additionally or alternatively to determining keywords using semantic relationships in the network 500. For example, while the network 500 may include a semantic relationship between Actor X and his stage performances, a corresponding keyword (e.g., "Stage") may not be determined if there is not a high frequency of submission of search queries relating to Actor X's stage performances. As another example, a threshold high frequency of submission of search queries regarding Actor X and his movie "Movie #1" may cause "Movie #1" to be determined as a keyword, despite "Movies" also being determined as a keyword. Other examples are also possible.

Each subject matter in the network 500 may also include metadata that may be used to determine the keywords. For example, metadata 508 associated with Actor X 502 may include his height, his nationality, his birthdate, the date of his death, information about his family, where he grew up, and other data. Therefore, one or more of the determined keywords may be associated with the metadata 508 (e.g., the keyword, "Birthday," as shown in FIG. 4). In some examples, prior search queries relating to the metadata 508 may be used to determine the keywords. For instance, "When was Actor X born?" or other search queries including search terms relating to Actor X's birth may have a threshold high frequency of submission, and so a keyword such as "Birthday" may be determined.

Referring back to FIG. 3, at block 306, the method includes the computing device configuring the plurality of keywords as a plurality of audio instructions (e.g., a new audio command) receivable by the computing device to cause the computing device to perform a subsequent search query. Once the keywords are determined by a server (or the HMD) and received by the HMD, the HMD may configure itself to recognize utterances of the keywords. As such, a user of the HMD may not need to take any action to perform subsequent searches other than speaking one of the keywords. For example, after performing a search query, the HMD may be configured such that the user can press a button or use a touchpad to perform subsequent search queries. However, once the keywords are determined, the user may only need to speak the keywords to perform the subsequent search queries. As another example, after searching for Actor X, the user may speak the keyword "Birthday" instead of having to speak the phrase "Search for Actor X's birthday." However, as yet another example, if the user wants to search for Actor X's movie, "Movie #5," and "Movie #5" is not included as a keyword, the user may not be able to speak the word "Movie #5" in order to perform a subsequent search query. Rather, the user may be required to press a button to perform a new search query, or precede "Movie #5" with the phrase, "Search for . . . ," or another phrase/word that is recognizable by the HMD for performing a search query. If the user does not want to start over and perform a new search, the user can alternatively speak the keyword "Movies," and then speak "Movie #5" if "Movie #5" is a determined keyword (e.g., "Search for Actor X. Movies. Movie #5."). Other examples are also possible.

In some embodiments, upon receiving the audio command for the HMD to perform an initial search query, a search session may be initiated. The search session may include multiple search queries (e.g., sequential search queries), starting with the initial search query and continuing until the user starts over by performing a new search (e.g., by pushing a given button, speaking "Search for . . . ," etc.) so as to initiate a new search session. Further, the user may be enabled to initiate a new search session at any point after the initial search session is initiated. While within a given search session, the determined keywords associated with each search query may be configured as "hotwords" (e.g., the audio instructions) that can cause the HMD to perform subsequent search queries. Outside of the given search session, however, the hotwords may be ignored and not recognized by the HMD.

It should be understood that in some embodiments, the HMD may be configured to recognize other spoken commands in addition to the determined keywords and search commands. For example, the HMD may include a menu of keywords associated with functions unrelated to search functions, such as powering the HMD on and off, returning to a home screen, taking pictures, recording videos, making/receiving a call, etc.

At block 308, the method includes providing the plurality of keywords for display, along with search results associated with the search query. The keywords and search results can be displayed locally at the HMD or remotely at another computing device that may be in communication with the HMD.

Figure 6A:
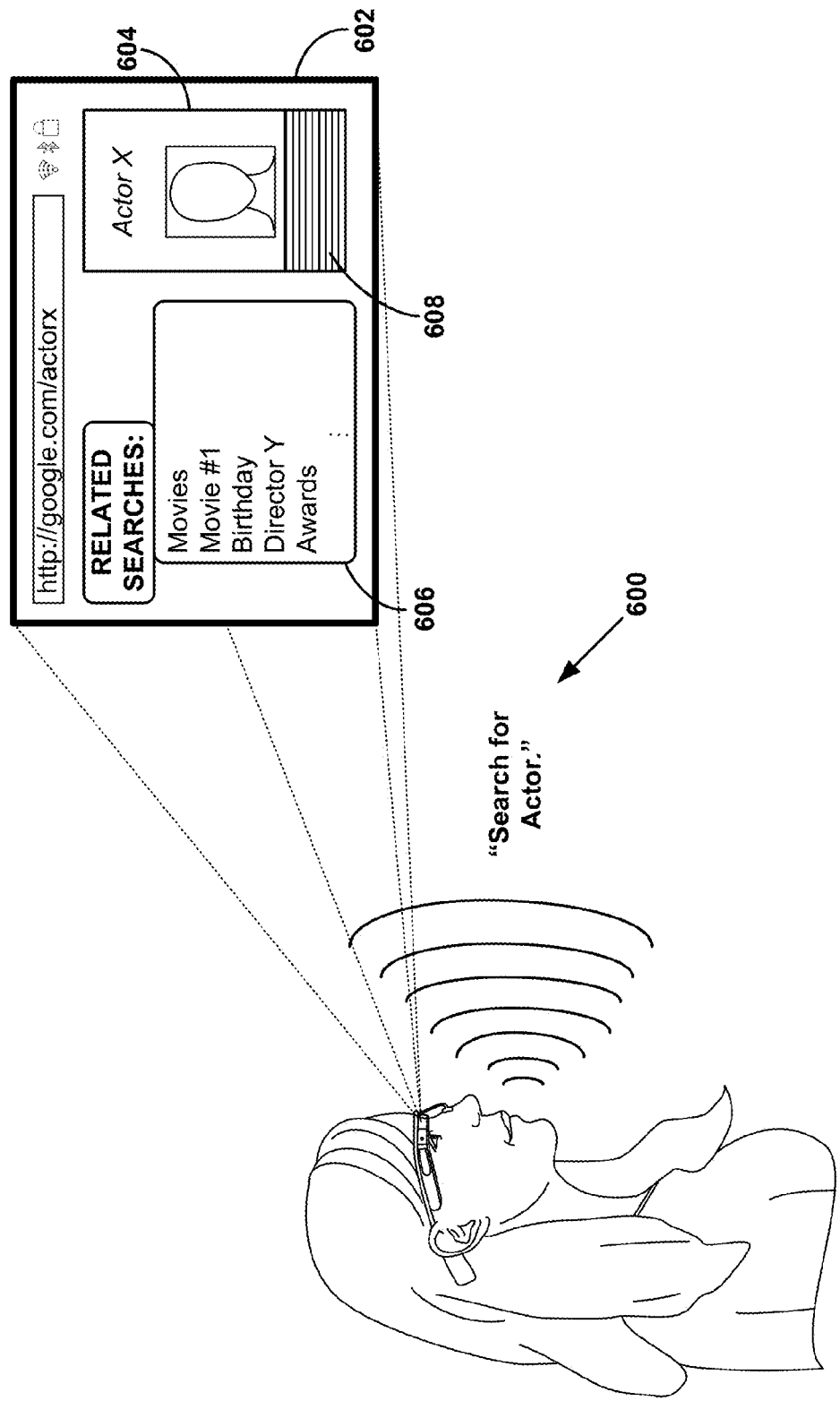
FIGS. 6A and 6B illustrate an example wearable computing device implementing features of the example method, according to an example embodiment.
Figure 6B:
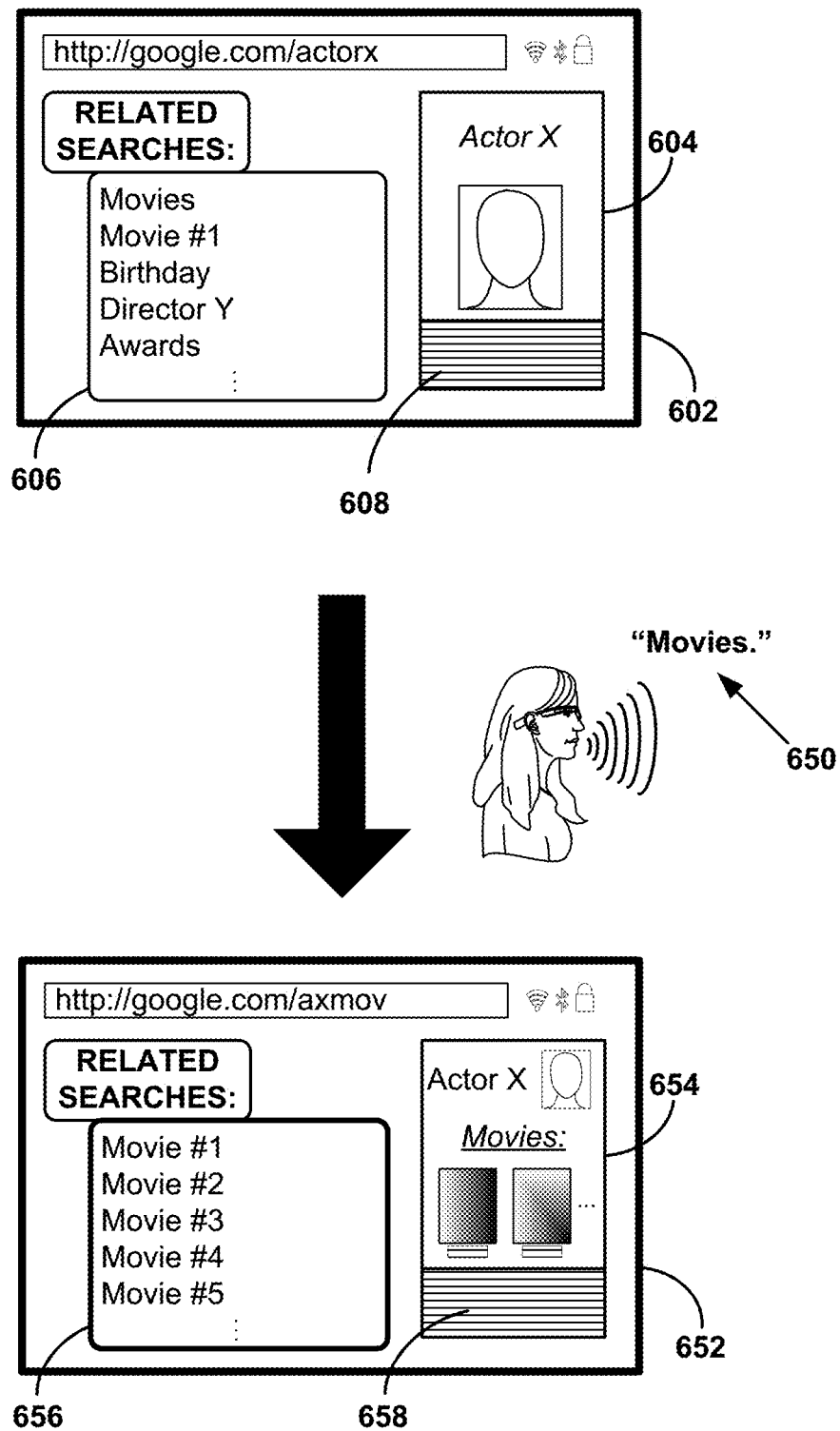

FIGS. 6A and 6B illustrate an example HMD implementing features of the method 300. As shown in FIG. 6A, a user of the HMD may provide an audio command 600, "Search for Actor X," so as to cause the HMD to perform a search query for the actor Actor X. The audio command 600 may take other forms and include other utterances recognizable by the HMD for initiating search queries. For example, the user may speak the phrase "Ok, HMD. Search for Actor X." However, if the user only says "Actor X," the HMD may not recognize the utterance as an audio command to perform a search and make take no action in response to hearing "Actor X."

After receiving the audio command 600, the HMD may provide an interface 602 for display on the HMD. The interface 602 may include search results 604 associated with Actor X. The interface 602 may also include a speakable menu of keywords 606 determined by the HMD in accordance with one or more of the methods described above (e.g., a semantic network). Further, the interface 602 may include metadata 608 associated with Actor X or other data associated with the search results 604. In some examples, metadata may not be provided, and the HMD may instead provide keywords associated with the metadata.

As shown in FIG. 6B, the user of the HMD may provide a subsequent audio command 650 (e.g., an audio instruction) including an utterance of the determined keyword, "Movies." After receiving the subsequent audio command 650, the HMD may provide a subsequent interface 652 for display on the HMD. The subsequent interface 652 may include search results 654 associated with movies that Actor X has acted in. The subsequent interface 652 may also include a subsequent speakable menu of keywords 656 determined by the HMD in accordance with one or more of the methods described above. Further, the subsequent interface 652 may include metadata 658 or other information associated with movies that Actor X has acted in (or information related to movies in general, in some examples). It should be understood that other example interfaces are possible as well, and some example interfaces may include more or less information than the interfaces illustrated in FIGS. 6A and 6B.

The user of the HMD may continue to perform a sequence of search queries by speaking keywords. For example, after being presented with the menu of keywords 656 in interface 652, the user can speak one of the keywords 656, such as "Movie #5," in order to obtain search results associated with the movie "Movie #5." Further, keywords associated with "Movie #5" may then be determined, such as a keyword associated with Actress Z. Still further, the user may then obtain search results associated with Actress Z, and so on. A corresponding sequence of spoken commands for this example may include "Search for Actor X. Movies. Movie #5. Actress Z. Birth. Chicago . . . " and so on, if the user desires to continue the sequence of search queries without starting a new search (e.g., initiating a new search by speaking "Search for . . . " followed by a new subject matter).

In some embodiments, a sequence of spoken keywords may represent a traverse through a semantic network, such as network 500. In general, each node (e.g., a subject matter, search term, etc.) in the network 500 may be related to at least one other node. Referring back to network 500, the user of the HMD may be enabled to traverse through the network 500 starting at a first node (e.g., node 502, "Actor X") by speaking keywords associated with each subsequent node (e.g., "Search for Actor X. Awards. Movie #2.") based on the relationships between nodes.

It should be understood, however, that not all determined keywords may be directly associated with the subject matter of the initial search. For example, in network 500, Movie #5 may be called "Vertigo" and the "Vertigo" node may have a semantic relationship with a node for the eponymous medical condition, vertigo. As such, after initially performing a search query for Actor X, the user can eventually obtain search results for the medical condition vertigo by traversing through the network 500 using the keywords (e.g., "Search for Actor X. Movies. Vertigo. Vertigo (Medical Condition)."). As another example, certain metadata associated with a particular node may be unrelated to the subject matter of the initial search query.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
    receiving, at a head-mountable computing device (HMD), an audio command corresponding to a search query;
    in response to receiving the audio command, using semantic mapping data to determine a first set of keywords corresponding to the search query, wherein the semantic mapping data specifies relationships between search queries and keywords;
    providing, on a display of the HMD, a first menu comprising the first set of keywords, along with search results associated with the search query;
    configuring a speech recognition system of the HMD to recognize, for each keyword in the first menu provided on the display of the HMD, a corresponding audio instruction for causing the HMD to perform a subsequent search query of the keyword of the first menu;
    receiving, at the HMD, a particular audio instruction to perform a subsequent search query of a particular keyword of the first menu of keywords provided on the display of the HMD;
    in response to receiving the particular audio instruction, using the semantic mapping data to determine a second set of keywords corresponding to the subsequent search query of the particular keyword;
    providing, on the display of the HMD, a second menu comprising the second set of keywords, along with search results associated with the subsequent search query of the particular keyword; and configuring the speech recognition system of the HMD (i) to recognize, for each keyword in the second menu provided on the display of the HMD, a corresponding audio instruction for causing the HMD to perform another subsequent search query of the keyword of the second menu, and (ii) to no longer recognize at least one keyword of the first menu.

2. The method of claim 1, wherein determining the first set of keywords comprises selecting a given keyword to be in the first set of keywords based on a determination that a frequency of submission of one or more prior search queries of the given keyword exceeds a threshold.

3. The method of claim 1, wherein the corresponding audio instruction for causing the HMD to perform the subsequent search query of the keyword of the first menu includes a spoken utterance of the keyword of the first menu.

4. A head-mountable computing device (HMD), comprising:
   a display;
   at least one audio sensor;
   a speech recognition system;
   at least one processor; and
   data storage comprising instructions that, when executed by the at least one processor, cause the HMD to perform functions comprising:
      receiving, via the at least one audio sensor of the HMD, an audio command corresponding to a search query;
      in response to receiving the audio command, using semantic mapping data to determine a first set of keywords corresponding to the search query, wherein the semantic mapping data specifies relationships between search queries and keywords;
      providing, on the display of the HMD, a first menu comprising the first set of keywords, along with search results associated with the search query;
      configuring the speech recognition system of the HMD to recognize, for each keyword in the first menu provided on the display of the HMD, a corresponding audio instruction for causing the HMD to perform a subsequent search query of the keyword of the first menu;
      receiving, via the at least one audio sensor of the HMD, a particular audio instruction to perform a subsequent search query of a particular keyword of the first menu of keywords provided on the display of the HMD;
      in response to receiving the particular audio instruction, using the semantic mapping data to determine a second set of keywords corresponding to the subsequent search query of the particular keyword;
      providing, on the display of the HMD, a second menu comprising the second set of keywords, along with search results associated with the subsequent search query of the particular keyword; and
      configuring the speech recognition system of the HMD (i) to recognize, for each keyword in the second menu provided on the display of the HMD, a corresponding audio instruction for causing the HMD to perform another subsequent search query of the keyword of the second menu, and (ii) to no longer recognize at least one keyword of the first menu.

5. The HMD of claim 4, wherein determining the first set of keywords comprises selecting a given keyword to be in the first set of keywords based on a determination that a frequency of submission of one or more prior search queries of the given keyword exceeds a threshold.

6. The HMD of claim 4, wherein the corresponding audio instruction for causing the HMD to perform the subsequent search query of the keyword of the first menu includes a spoken utterance of the keyword of the first menu.

7. A non-transitory computer readable medium having stored thereon instructions that, upon execution by a head-mountable computing device (HMD), cause the HMD to perform functions comprising:
   receiving an audio command corresponding to a search query;
   in response to receiving the audio command, using semantic mapping data to determine a first set of keywords corresponding to the search query, wherein the semantic mapping data specifies relationships between search queries and keywords;
   providing, on a display of the HMD, a first menu comprising the first set of keywords, along with search results associated with the search query; and
   configuring a speech recognition system of the HMD to recognize, for each keyword in the first menu provided on the display of the HMD, a corresponding audio instruction for causing the HMD to perform a subsequent search query of the keyword of the first menu;
   receiving a particular audio instruction to perform a subsequent search query of a particular keyword of the first menu of keywords provided on the display of the HMD;
   in response to receiving the particular audio instruction, using the semantic mapping data to determine a second set of keywords corresponding to the subsequent search query of the particular keyword;
   providing, on the display of the HMD, a second menu comprising the second set of keywords, along with search results associated with the subsequent search query of the particular keyword; and
   configuring the speech recognition system of the HMD (i) to recognize, for each keyword in the second menu provided on the display of the HMD, a corresponding audio instruction for causing the HMD to perform another subsequent search query of the keyword of the second menu, and (ii) to no longer recognize at least one keyword of the first menu.

8. The non-transitory computer readable medium of claim 7, wherein determining the first set of keywords comprises selecting a given first keyword to be in the first set of keywords based on a determination that a frequency of submission of one or more prior search queries of the given first keyword exceeds a threshold, and wherein determining the second set of keywords comprises selecting a given second keyword to be in the second set of keywords based on a determination that a frequency of submission of one or more prior search queries of the given second keyword exceeds a threshold.

9. The non-transitory computer readable medium of claim 7, wherein the corresponding audio instruction for causing the HMD to perform the subsequent search query of the keyword of the first menu includes a spoken utterance of the keyword of the first menu, and wherein the corresponding audio instruction for causing the HMD to perform another subsequent search query of the keyword of the second menu includes a spoken utterance of the keyword of the second menu.

* * * * *